(12) United States Patent
Dohner et al.

(10) Patent No.: US 10,711,161 B2
(45) Date of Patent: Jul. 14, 2020

(54) ADHESIVE SYSTEM WITH HIGHLY REACTIVE PRETREATMENT AGENT

(71) Applicant: SIKA TECHNOLOGY AG, Baar (CH)

(72) Inventors: Reto Dohner, Zürich (CH); Dana Maiwald, Zürich (CH); Stefan Egli, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 238 days.

(21) Appl. No.: 15/518,653

(22) PCT Filed: Oct. 20, 2015

(86) PCT No.: PCT/EP2015/074281
§ 371 (c)(1),
(2) Date: Apr. 12, 2017

(87) PCT Pub. No.: WO2016/062728
PCT Pub. Date: Apr. 28, 2016

(65) Prior Publication Data
US 2017/0240772 A1    Aug. 24, 2017

(30) Foreign Application Priority Data

Oct. 23, 2014 (EP) .................................... 14190130

(51) Int. Cl.
| | | |
|---|---|---|
| *C09J 5/02* | (2006.01) | |
| *C09J 175/04* | (2006.01) | |
| *C03C 27/04* | (2006.01) | |
| *C08G 18/38* | (2006.01) | |
| *C03C 17/30* | (2006.01) | |
| *C09J 5/04* | (2006.01) | |
| *C03C 27/10* | (2006.01) | |
| *C09J 183/08* | (2006.01) | |
| *B32B 17/06* | (2006.01) | |
| *C08G 77/26* | (2006.01) | |
| *B32B 7/12* | (2006.01) | |
| *B32B 37/12* | (2006.01) | |

(52) U.S. Cl.
CPC ................ *C09J 5/02* (2013.01); *B32B 17/06* (2013.01); *C03C 17/30* (2013.01); *C03C 27/048* (2013.01); *C03C 27/10* (2013.01); *C08G 18/3876* (2013.01); *C09J 5/04* (2013.01); *C09J 175/04* (2013.01); *C09J 183/08* (2013.01); *B32B 7/12* (2013.01); *B32B 37/1284* (2013.01); *B32B 2315/08* (2013.01); *B32B 2605/00* (2013.01); *C08G 77/26* (2013.01); *C09J 2203/10* (2013.01); *C09J 2205/30* (2013.01); *C09J 2400/146* (2013.01); *C09J 2400/20* (2013.01); *C09J 2483/003* (2013.01)

(58) Field of Classification Search
None
See application file for complete search history.

(56) References Cited

U.S. PATENT DOCUMENTS

| | | | |
|---|---|---|---|
| 2006/0122352 A1 | 6/2006 | Burckhardt | |
| 2011/0104504 A1* | 5/2011 | Dohner | ................ C08G 18/289 428/447 |
| 2012/0301729 A1* | 11/2012 | Schmider | ........... C08G 18/1875 428/423.1 |

FOREIGN PATENT DOCUMENTS

| | | |
|---|---|---|
| EP | 1923361 A1 | 5/2008 |
| EP | 2128103 A1 | 12/2009 |
| WO | 2005/059056 A1 | 6/2005 |
| WO | 2009/150064 A2 | 12/2009 |
| WO | 2013/030270 A1 | 3/2013 |
| WO | 2013/041573 A1 | 3/2013 |

OTHER PUBLICATIONS

Feb. 4, 2016 International Search Report issued in International Patent Application No. PCT/EP2015/074281.
Apr. 25, 2017 International Preliminary Report on Patentability issued in International Patent Application No. PCT/EP2015/074281.
Aug. 27, 2019 Office Action issued in Japanese Patent Application No. 2017-521987.
Sep. 30, 2019 Office Action issued in Chinese Patent Application No. 201580057205.6.
May 9, 2020 Office Action issued in Chinese Patent Application No. 201580057205.6.

* cited by examiner

*Primary Examiner* — Marc S Zimmer
(74) *Attorney, Agent, or Firm* — Oliff PLC

(57) ABSTRACT

An adhesive system, having an adhesion promoter composition, containing at least one mercaptosilane, at least one polysilane, at least one transition metal complex having substantially only monodentate ligands, and at least one non-alcoholic solvent, and an adhesive, wherein the adhesive, within an hour after application and storage at 23° C. and 50% relative air humidity, has a tensile shear strength of at least 3 MPa, as measured according to ISO 4587, and/or, within an hour after application and storage at 23° C. and 50% relative air humidity, has at least 50%, preferably at least 60%, of the tensile shear strength achievable after application and storage for 7 days at 23° C. and 50% relative air humidity, as measured according to ISO 4587. An adhesion promoter system has a liquid container having a manually actuable output apparatus, and an adhesion promoter composition, as disclosed above.

15 Claims, No Drawings

ADHESIVE SYSTEM WITH HIGHLY REACTIVE PRETREATMENT AGENT

TECHNICAL FIELD

The invention relates to adhesive systems consisting of adhesion promoter and adhesive, and also to their application, particularly for the bonding of glass sheets in means of transport.

PRIOR ART

Adhesive bonding represents a joining technology which is often utilized nowadays, and plays a major part in construction and industry. Modern adhesives are highly developed systems which are able to join a host of different substrates to one another and which may have properties tailored to the particular field of application. With many fields of application or substrates, however, pretreatments are needed to the surfaces to be bonded, in order to ensure an optimum adhesive effect. After the substrates have been cleaned, reactive adhesion promoter compositions, such as primers or activators, for example, are often employed. These are liquid solutions or emulsions which react chemically with the substrates and also with the adhesive and thus form an interface to the substrate that is optimum for the adhesive. Adhesion promoters used for glass and ceramic surfaces, for example, are often mixtures of organic silanes and solvents and also, optionally, organometallic catalysts. WO-A-2005/059056, for example, describes a primer which as well as an organotitanate and an organic solvent comprises a mercaptosilane and a polyaminosilane and a secondary aminosilane.

Another example of such adhesion promoter compositions is taught in WO-A-2009/150064, where particularly effective bonds to glass and glass-ceramic were achievable using a composition containing aromatic aminosilanes.

Onward development of the adhesives toward ever more rapid systems with shorter cycle times, in industrial manufacture or in the automobile windshield repair sector, for instance, means nevertheless that such adhesion promoter compositions no longer satisfy the requirements of speed. Very rapid-curing adhesives, indeed, require very rapidly reacting adhesion promoters so that reaction with one another is able to ensure effective adhesion on the substrate. For highly demanding applications, therefore, the adhesive and the adhesion promoter must be considered as an adhesive system whose constituents (at least adhesion promoter and adhesive) must be harmonized with one another. Likewise, there are also increases in the requirements for application rate and open time, the requirement being that application of adhesion promoter and adhesive shall take place in ever shorter cycle times and with as few, simple operating steps as possible. At the same time, however, there must be no compromise as far as the adhesion of the adhesive systems is concerned. Moreover, particularly, for example, in the area of repair of automobile windows in situ, the prevailing temperatures are sometimes low (down to below the freezing point, e.g., −10° C.), meaning that such adhesive systems must function impeccably under low-temperature conditions. This is often a drastic limitation on the use of conventional adhesive systems. Consequently, there continues to be a great need for extremely rapid adhesive systems which can be applied with a few, simple steps and which nevertheless permit reliable bonding even under low-temperature conditions.

A disadvantage of adhesion promoter systems available on the market, wherein the adhesion promoter is kept in a container which can be opened and closed again, is that after a relatively short time, such as a month, for instance, decomposition means that the adhesion promoter no longer has suitable properties. After this time, therefore, adhesion promoter which has not been used must be discarded. This problem exists in particular with the adhesion promoter systems which include mercaptosilanes and transition metal complexes that activate the mercaptosilanes. Additionally, therefore, there is a demand for an adhesion promoter system wherein adhesion promoters containing mercaptosilanes and transition metal complexes, after having once been used, remain stable and useable over an extended period.

SUMMARY OF THE INVENTION

It is an object of the present invention, therefore, to provide an adhesive system which can be applied rapidly and simply, and which cures very rapidly and with very good adhesion properties, even under low-temperature conditions such as −10° C., for example, and is suitable, for example, for the bonding of means-of-transport windows.

This is achieved in accordance with the invention through the features of the first claim.

The advantages of the invention are to be seen as being, among others, that a more rapid development of adhesion and more rapid application are possible in comparison to conventional adhesive systems, even at very low temperatures. The adhesive system of the invention, accordingly, can be used even in situ in winter for repair of means-of-transport windows, for example, permitting short driveaway times even in such scenarios.

A further object is to provide an adhesion promoter system which remains stable over as long a period as possible without decomposing and without crystallizing, and which can therefore be used over a long period even if used in between times.

Further aspects of the invention are subjects of further independent claims. Particularly preferred embodiments of the invention are subjects of the dependent claims.

CERTAIN EMBODIMENTS OF THE INVENTION

A subject of the present invention is an adhesive system comprising:

a) an adhesion promoter composition comprising:
  i) at least one mercaptosilane MS, and
  ii) at least one polysilane PS, and
  iii) at least one transition metal complex K having substantially only unidentate ligands, more particularly a titanium and/or zirconium complex, and
  iv) at least one nonalcoholic solvent L, more particularly a hydrocarbon, ketone, and/or carboxylic ester, and
b) an adhesive, wherein
  the adhesive within an hour after application and storage at 23° C. and 50% relative humidity has a tensile shear strength of at least 3 MPa, measured according to ISO 4587, and/or within an hour after application and storage at 23° C. and 50% relative humidity has at least 50%, preferably at least 60%, of the tensile shear strength attainable after application and storage for 7 days at 23° C. and 50% relative humidity, measured according to ISO 4587.

A further subject of the present invention is an adhesion promoter system, comprising a liquid-container having a manually operable delivery device, which contains an adhesion promoter composition comprising:
i) at least one mercaptosilane MS, and
ii) at least one polysilane PS, and
iii) at least one transition metal complex K having substantially only unidentate ligands, more particularly a titanium and/or zirconium complex, and
iv) at least one nonalcoholic solvent L, more particularly a hydrocarbon, ketone, and/or carboxylic ester.

Yet another subject of the present invention is an adhesive system as described above wherein the adhesion promoter composition is in a liquid-container with manually operable delivery device.

The term "organoalkoxysilane", or "organoacyloxysilane", or "silane" for short refers in the present document to compounds in which firstly there are at least one, customarily 2 or 3, alkoxy groups, or acyloxy groups, respectively, bonded directly to the silicon atom (via an Si—O bond), and which secondly have at least one organic radical bonded directly to the silicon atom (via an Si—C bond) and have no Si—O—Si bonds. Correspondingly, the term "silane group" identifies the silicon-containing group bonded to the organic radical of the organoalkoxysilane or organoacyloxysilane, respectively. The organoalkoxysilanes or organoacyloxysilanes, and their silane groups, have the property of hydrolyzing on contact with moisture. This hydrolysis forms organosilanols, in other words organosilicon compounds containing one or more silanol groups (Si—OH groups), and, through subsequent condensation reactions, organosiloxanes, in other words organosilicon compounds containing one or more siloxane groups (Si—O—Si groups).

Silanes which have amino, mercapto, and oxirane groups in the organic radical bonded to the silicon atom of the silane group are identified as "aminosilanes", "mercaptosilanes", and "epoxysilanes", respectively. A primary aminosilane has a primary amino group —NH$_2$. A secondary aminosilane has a secondary amino group —NH—. An aromatic secondary aminosilane has an aromatic secondary amino group. In the case of the aromatic secondary amino group, the secondary amino group is bonded directly to an aromatic radical, as is the case in N-methylaniline, for example. A tertiary aminosilane has a tertiary amino

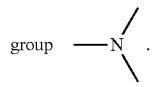

Substance names beginning with "poly", such as polysilane, polyol, polyisocyanate, polymercaptan or polyamine, refer in the present document to substances which, formally, contain 2 or more per molecule of the functional groups that occur in their name.

In this document, the use of the term "independently of one another" or "independently at each occurrence" in connection with substituents, radicals or groups is to be interpreted to mean that within the same molecule the substituents, radicals or groups identified in the same way may occur simultaneously with different definitions.

Mercaptosilanes MS suitable for the composition preferably have the formula (II).

(II)

In this formula, $R^2$ independently at each occurrence is an alkyl group having 1 to 4 C atoms or an acyl group having 1 to 4 C atoms, preferably methyl. Moreover, $R^3$ independently at each occurrence is H or is an alkyl group having 1 to 10 C atoms, and $R^1$ is a linear or branched alkylene group having 1 to 6 C atoms, more particularly propylene, and c has a value of 0, 1 or 2, preferably 0.

Especially suitable as mercaptosilanes MS are mercaptosilanes selected from the group consisting of mercaptomethyltrimethoxysilane, mercaptomethyl-triethoxysilane, mercaptomethyldimethoxymethylsilane, mercaptomethyldiethoxymethylsilane, 3-mercaptopropyltrimethoxysilane, 3-mercaptopropyltriethoxysilane, 3-mercaptopropyltriisopropoxysilane, 3-mercaptopropylmethoxy(1,2-ethylenedioxy)silane, 3-mercaptopropylmethoxy(1,2-propylenedioxy)silane, 3-mercaptopropylethoxy(1,2-propylenedioxy)silane, 3-mercaptopropyldimethoxymethylsilane, 3-mercaptopropyldiethoxymethylsilane, 3-mercapto-2-methylpropyltrimethoxysilane, and 4-mercapto-3,3-dimethylbutyltrimethoxysilane.

Preferred as mercaptosilanes MS are 3-mercaptopropyltrimethoxysilane and 3-mercaptopropyltriethoxysilane, more particularly 3-mercaptopropyltrimethoxysilane.

The composition typically comprises at least one mercaptosilane MS, with a weight fraction of mercaptosilane MS of 0.5 wt %-10 wt %, more particularly 1 wt %-7 wt %, preferably 2 wt %-5 wt %, based on the weight of the composition.

A suitable polysilane PS in a first embodiment is a polysilane PS1 which has at least one secondary or tertiary amino group. Suitable in a second embodiment is a polysilane PS2 which is obtainable from a reaction of an aminosilane or mercaptosilane with a polyisocyanate or with a polyurethane polymer containing isocyanate groups.

Polysilane PS1 has at least one secondary or tertiary amino group, more particularly a secondary amino group. Especially suitable are aminosilanes of the formula (III).

(III)

In this formula, $R^4$ is an n-valent organic radical having at least one secondary or tertiary amino group. $R^5$ independently at each occurrence is an alkyl group having 1 to 4 C atoms or an acyl group having 1 to 4 C atoms. The index a has a value of 0, 1 or 2. Moreover, $R^6$ independently at each occurrence is H or is an alkyl group having 1 to 10 C atoms, and n has a value of 2, 3 or 4. With particular preference n is 2 or 3; in other words, preferably, the polysilane PS1 has 2 or 3 silane groups. Preferred are polysilanes PS1 having 2 silane groups. Polysilanes PS1 where a=0 are preferred. Preferred as $R^5$ are methyl, ethyl, propyl, and butyl groups and also their positional isomers. Most preferably $R^5$ is a methyl group.

Firstly preferred as polysilanes PS1 are polysilanes having the formula (IV).

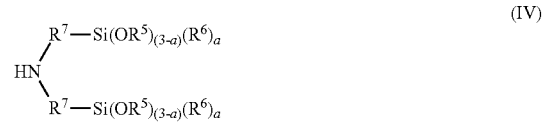
(IV)

In this formula $R^7$ is a linear or branched alkylene group having 1 to 6 C atoms, more particularly a propylene group.

Particularly preferred polysilanes PS1 include bis(3-trimethoxysilylpropyl)amine and bis(3-triethoxysilylpropyl)amine. The most preferred polysilane PS1 is bis(3-trimethoxysilylpropyl)amine.

Secondly preferred polysilanes PS1 are polysilanes which have at least one structural element of the formula (V) or (VI), more particularly of the formula (V-1) or (VI-1),

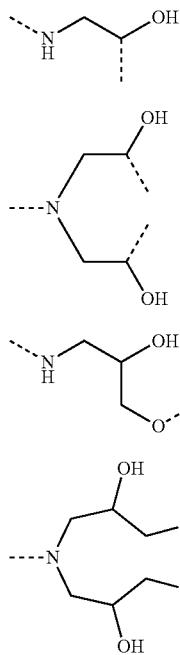

Such polysilanes PS1 of the formula V and VI, or V-1 and VI-1, can be prepared via reactions of primary or secondary amines with epoxides, or with glycidyl ethers. The silane groups may come either from the amine or from the epoxide, or from the glycidyl ether. The dashed lines in the formulae in this document each represent the bond between the respective substituent and the associated remainder of the molecule.

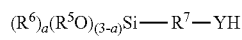

Such polysilanes PS1 are firstly, for example, the reaction products of 3-aminopropyltrimethoxysilane or bis(3-trimethoxysilylpropyl)amine with bisphenol A diglycidyl ether or hexanediol diglycidyl ether.

Such polysilanes PS1 are secondly, for example, reaction products of an epoxysilane of the formula (VII) with an aminosilane of the formula (VIII).

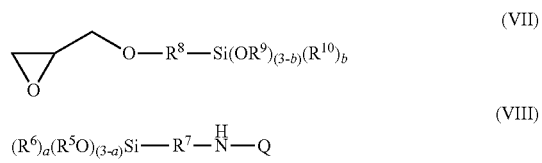

In these formulae, $R^9$ independently at each occurrence is an alkyl group having 1 to 4 C atoms or an acyl group having 1 to 4 C atoms. $R^9$ is preferably a methyl group. $R^{10}$ independently at each occurrence is H or is an alkyl group having 1 to 10 C atoms. $R^7$ and $R^8$ independently of one another are each a linear or branched alkylene group having 1 to 6 C atoms, more particularly propylene. Q is H or an alkyl, cycloalkyl or aryl radical having 1 to 20 C atoms, or a radical of the formula $-(CH_2-CH_2-NH)_dH$, or is a radical of the formula $-R^7-Si(OR^5)_{(3-a)}(R^6)_a$. The index b has a value of 0, 1 or 2, preferably 0. The index d has a value of 1 or 2.

$R^6$, $R^5$, and a have the definitions already described for formula (III).

Such polysilanes PS1 may have a structure of the formula (IX).

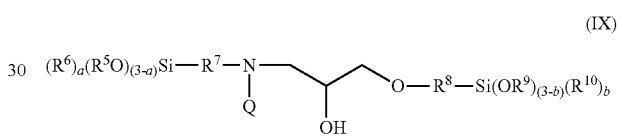

Particularly preferred as polysilane PS1 which has at least one secondary or tertiary amino group are reaction products of 3-aminopropyltrimethoxysilane or bis(3-trimethoxysilylpropyl)amine and 3-glycidyloxypropyltrimethoxysilane.

Particularly suitable as polysilanes PS2 are polysilanes which are obtained from the reaction of at least one aminosilane or mercaptosilane of the formula (X) with at least one polyisocyanate or with at least one polyurethane polymer containing isocyanate groups. Such polysilanes PS2 have, in particular, the formula (XI).

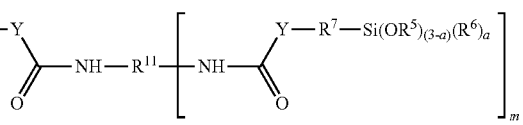

In this formula, Y is NQ or S. Furthermore, $R^{11}$ is a polyisocyanate or polyurethane polymer containing isocyanate groups, after removal of m NCO groups, and m has a value of 1, 2 or 3, more particularly 1 or 2.

Particularly suitable as aminosilanes of the formula (X) are aminosilanes having primary amino groups, which are selected from the group consisting of 3-aminopropyltrimethoxysilane, 3-aminopropyldimethoxymethylsilane, 3-amino-2-methylpropyltrimethoxysilane, 4-aminobutyltrimethoxysilane, 4-aminobutyl-dimethoxymethylsilane, 4-amino-3-methylbutyltrimethoxysilane, 4-amino-3,3-dimethylbutyltrimethoxysilane, 4-amino-3,3-dimethylbutyldimethoxymethyl-silane, 2-aminoethyltrimethoxysilane, 2-aminoethyldimethoxymethylsilane, aminomethyltrimethoxysilane, aminomethyldimethoxymethylsilane, and amino-methyimethoxydimethylsilane. Preferred are 3-aminopropyltrimethoxysilane and 3-aminopropylmethyldimethoxysilane.

Although they are slower to react, aminosilanes having secondary amino groups may also be used as aminosilanes of the formula (X).

Particularly suitable are aminosilanes having secondary amino groups that are selected from the group consisting of N-methyl-3-aminopropyltrimethoxysilane, N-ethyl-3-aminopropyltrimethoxysilane, N-butyl-3-aminopropyltrimethoxysilane, N-cyclohexyl-3-aminopropyltrimethoxysilane, N-phenyl-3-aminopropyltrimethoxysilane, N-methyl-3-amino-2-methylpropyltrimethoxysilane, N-ethyl-3-amino-2-methylpropyltrimethoxysilane; N-ethyl-3-aminopropyldimethoxymethylsilane, N-phenyl-4-aminobutyltrimethoxysilane, N-phenylaminomethyldimethoxymethylsilane, N-cyclohexylaminomethyldimethoxymethylsilane, N-methylaminomethyldimethoxymethylsilane, N-ethylaminomethyldimethoxy-methylsilane, N-propylaminomethyldimethoxymethylsilane, N-butylaminomethyldimethoxymethylsilane; N-(2-aminoethyl)-3-aminopropyltrimethoxysilane, 3-[2-(2-aminoethylamino) ethylamino]propyltrimethoxysilane, N-(2-aminoethyl)-3-aminopropylmethyldimethoxysilane, 3-[2-(2-aminoethylamino)-ethylamino] propylmethyldimethoxysilane, bis(3-trimethoxysilylpropyl) amine, and bis(3-triethoxysilylpropyl)amine.

Preferred aminosilanes of the formula (X) having secondary amino groups are N-butyl-3-aminopropyltrimethoxysilane, N-methyl-3-aminopropyltrimethoxysilane, N-phenyl-3-aminopropyltrimethoxysilane or bis(3-trimethoxysilylpropyl)amine.

Particularly suitable mercaptosilanes of the formula (X) are the abovementioned mercaptosilanes MS.

Suitable polyisocyanates are, in particular, diisocyanates or triisocyanates. Commercially available polyisocyanates are preferred, such as, for example, 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine diisocyanate and lysine ester diisocyanate, cyclohexane 1,3- and 1,4-diisocyanate and any desired mixtures of these isomers, 1-isocyanato-3,3,5-trimethyl-5-isocyanatomethylcyclohexane (i.e., isophorone diisocyanate or IPDI), perhydro-2,4'- and -4,4'-diphenylmethane diisocyanate (HMDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, 2,4- and 2,6-tolylene diisocyanate and any desired mixtures of these isomers (TDI), 4,4'-, 2,4'-, and 2,2'-diphenylmethane diisocyanate and any desired mixtures of these isomers (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TORI), and also any desired mixtures of the aforementioned isocyanates and their biurets or their isocyanurates. Particularly preferred are MDI, TDI, HDI, and IPDI, and their biurets or isocyanurates.

Polyurethane polymers containing isocyanate groups can be obtained conventionally in particular from the aforementioned polyisocyanates and polyols and/or polyamines, as are disclosed in patent specification US 2006/0122352 A1 in paragraphs [0029] to [0041] and [0043] to [0044], whose content in particular is hereby incorporated by reference.

As polysilanes PS, PS1 are of advantage over PS2 in having a better solubility and a lower viscosity. Moreover, they are available commercially and distinguished by a lower price.

A particularly preferred polysilane PS is a polysilane of the formula (IV); most preferably the polysilane PS is a bis(3-trimethoxysilylpropyl)amine or bis(3-triethoxysilylpropyl)amine.

The composition typically comprises at least one polysilane PS, with a weight fraction of polysilane PS of 0.1 wt %-10 wt %, more particularly 0.5 wt %-7 wt %, preferably 1 wt %-5 wt %, based on the weight of the composition.

The adhesion promoter composition of the adhesive system of the invention further comprises at least one transition metal complex K having substantially only unidentate ligands.

The term "transition metal complex" refers to chemical complex compounds which are well known to the person skilled in the art and have a (primarily cationic) metal atom of the transition metals that is complexed by ligands. "Substantially only unidentate ligands" confines these complexes to nonmultidentate complexes, i.e., not chelate complexes. Preferred unidentate ligands are alkoxy groups.

The transition metal complex K is included preferably with a weight fraction of 0.5 wt %-15 wt %, more particularly of 1 wt %-12 wt %, preferably of 2 wt %-10 wt %, based on the weight of the composition.

The transition metal complex K is preferably an organotitanate compound (organotitanate) or a zirconate. The organotitanium compound or the zirconate here has at least one substituent (ligand) bonded via an oxygen-titanium bond or oxygen-zirconium bond to the titanium atom or zirconium atom, more particularly four substituents bonded via an oxygen-titanium bond or oxygen-zirconium bond, to the titanium atom or zirconium atom.

Particularly preferred are organotitanium compounds.

Preferred substituents are those having 4 to 8 C atoms. With particular preference these substituents are identical.

Preferred organotitanium compounds are available commercially, from, for example, Kenrich Petrochemicals or DuPont.

Particularly preferred is tetra(n-butyl) titanate, i.e., Tyzor® TBT.

It is clear to the person skilled in the art that if organotitanium compounds are used, these organotitanium compounds will hydrolyze under the influence of water and form OH groups bonded to the titanium atoms. Such hydrolyzed, or partially hydrolyzed, organotitanium compounds may then in turn condense and form condensation products which have Ti—O—Ti bonds. Where silanes and/or titanates are mixed as adhesion promoters, mixed condensation products are also possible, containing Si—O—Ti bonds. A small fraction of such condensation products is possible, particularly if they are soluble, emulsifiable or dispersible.

If the adhesion promoter composition of the adhesive system of the invention includes at least one organotitanium compound, that compound is present preferably with a weight fraction of organotitanium compound of 0.5 wt %-15 wt %, more particularly of 1 wt %-12 wt %, preferably of 2 wt %-10 wt %, based on the weight of the composition.

The adhesion promoter composition of the adhesive system of the invention further comprises at least one nonalcoholic solvent L, more particularly a hydrocarbon, ketone, and/or carboxylic ester. A solvent for the purposes of the present invention is a substance which is largely liquid at 23° C. under ambient pressure and which, in terms of quantity and with its physicochemical properties, is capable of uniting the other constituents of the composition to form a liquid mixture which is homogeneous in the absence of air. The solvent, moreover, ought to possess a certain volatility, in order to enable rapid application of the adhesive system.

The solvent ought to be substantially chemically inert toward the other constituents, in other words it ought not to react with them. Hence the proviso that it must be a "nonalcoholic" solvent. In spite of this, however, alcohols can be present in the adhesion promoter composition, albeit in a comparatively small quantity, as for example at less than 10 Wt %, preferably at most 5 wt %.

Suitable nonalcoholic solvents L of this kind for the purposes of the present invention are, in particular, hydrocarbons or ketones or carboxylic esters. Preferred examples thereof are toluene, xylene, hexane, heptane, methyl ethyl ketone, acetone, butyl acetate, and ethyl acetate. Particularly preferred are hexane, heptane, methyl ethyl ketone, acetone, butyl acetate, and ethyl acetate. Especially preferred is heptane.

The amount of nonalcoholic solvent L in the adhesion promoter composition of the adhesive system of the invention is preferably between 80 wt % and 99 wt %, more particularly between 85 wt % and 95 wt %, very preferably between 88 wt % and 94 wt %.

The adhesion promoter composition of the adhesive system of the invention preferably further comprises an aminosilane AS, which can have a positive influence on the adhesion of the adhesive system of the invention. Aminosilanes AS suitable for the composition preferably have the formula (I), or the formula (I'), or the formula (XII).

halogen atoms. More particularly e is 0. Furthermore, $L^5$ is an optionally branched alkylene radical having 1 to 5 C atoms. Moreover, f has a value of 0, 1 or 2 and e is an integer from 0 to 3.

Particularly suitable aminosilanes AS of the formula (I) are aromatic secondary aminosilanes which are selected from the group consisting of N-((trimethoxy-silyl)methyl) aniline, N-((triethoxysilyl)methyl)aniline, N-(3-(dimethoxy (methyl)-silyl)-2,2-dimethylpropyl)aniline, N-(3-(trimethoxysilyl)propyl)aniline, N-(3-(tri-ethoxysilyl) propyl)aniline, N-(4-(trimethoxysilyl)butyl)aniline, N-(5-(trimethoxy-silyl)pentyl)aniline, and N-(3-(diethoxy (methyl)silyl)-2-methylpropyl)aniline.

Examples of aromatic secondary aminosilanes AS of the formula (I') are 4,4'-methylenebis(N-(3-(trimethoxysilyl) propyl)aniline), 4,4'-(propane-2,2-diyl)bis(N-(3-(trimethoxysilyl)propyl)aniline), and 4,4'-methylenebis(2-methyl-N-(3-(trimethoxysilyl)propyl)aniline).

Preferred aromatic secondary aminosilanes AS are N-(3-(trimethoxy-silyl)propyl)aniline and N-(3-(triethoxysilyl) propyl)aniline, more particularly N-(3-(trimethoxysilyl)propyl)aniline.

Examples of aminosilanes AS of the formula (XII) are 3-aminopropylmethyldimethoxysilane, 3-aminopropyltrimethoxysilane, N-aminoethyl-3-aminopropylmethyldimethoxysilane, N-aminoethyl-3-aminopropyltrimethoxysilane, 3-aminopropyltriethoxysilane, and N-aminoethyl-3-aminopropyltriethoxysilane.

Preferred aminosilanes AS of the formula (XII) are 3-aminopropyltrimethoxysilane and N-aminoethyl-3-aminopropyltrimethoxysilane.

The adhesion promoter composition of the adhesive system of the invention preferably comprises at least one aminosilane AS, with a weight fraction of aminosilane AS of 0.1 wt %-10 wt %, more particularly 0.5 wt %-7 wt %, preferably 1 wt %-5 wt %, based on the weight of the composition.

The adhesion promoter composition of the adhesive system of the invention may optionally contain further con-

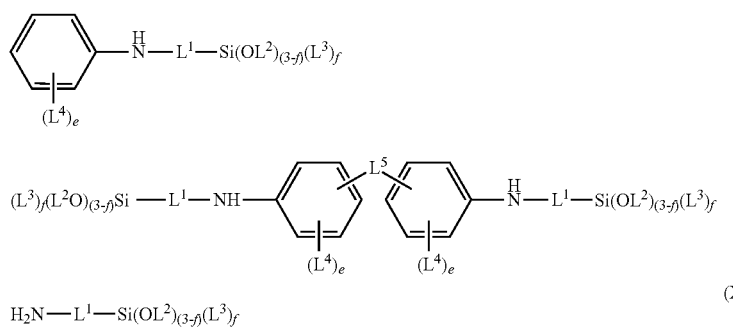

$L^1$ in these formulae is a linear or branched alkylene group, more particularly having 1 to 6, preferably having 3 or 4, C atoms, or is a 3-azahexylene radical. Moreover, $L^2$ independently at each occurrence is an alkyl group having 1 to 4 C atoms or an acyl group having 1 to 4 C atoms, preferably a methyl group. $L^3$ independently at each occurrence is H or is an alkyl group having 1 to 10 C atoms. $L^4$, moreover, independently at each occurrence, is an optionally branched alkyl radical having 1 to 5 C atoms, an optionally branched alkoxy radical having 1 to 5 C atoms, an optionally branched ester radical having 1 to 5 C atoms, $NO_2$ or stituents. Such further constituents, however, ought not to detract from the storage stability of the composition. Further constituents are, for example, luminescence indicators such as Uvitex® OB from Ciba Specialty Chemicals, stabilizers, surfactants, acids, dyes, and pigments.

The adhesion promoter composition of one particularly preferred adhesive system of the invention comprises or consists of a mercaptosilane MS, more particularly 3-mercaptopropyltrimethoxysilane, in an amount of 2 wt %-5 wt %, based on the total weight of the composition; a polysilane PS, more particularly bis(3-trimethoxysilylpropyl)amine, in an amount of 0.8 wt %-5 wt %, based on the total weight of the composition; an aminosilane AS, more particularly N-(3-(trimethoxysilyl)propyl)aniline, in an amount of 0.8 wt %-5 wt %, based on the total weight of the composition; a transition metal compound K, more particularly tetra(n-butyl) titanate, in an amount of 1 wt %-10 wt %, based on the total weight of the composition; and a nonalcoholic solvent L, more particularly heptane, in an amount of 80 wt %-94 wt %, based on the total weight of the composition.

Preferably, in the adhesion promoter composition of the adhesive system of the invention, the molar ratio of all mercaptosilanes MS used in the adhesion promoter composition to all polysilanes PS used in the adhesion promoter composition to all aminosilanes AS possibly used in the adhesion promoter composition to all transition metal complexes K used in the adhesion promoter composition is 1:0.05-1.5:0.05-1.5:0.1-3, more particularly 1:0.1-1.2:0.1-1.2:0.1-1.5.

Suitable adhesives for the adhesive system of the invention are one- or two-component, preferably elastic, adhesives or sealants which cure rapidly, i.e., within an hour after application at 23° C. and 50% r.h. have a tensile shear strength of at least 3 MPa, measured according to ISO 4587, and/or within an hour after application at 23° C. and 501© r.h. have at least 50%, preferably at least 60%, of the tensile shear strength attainable after application and storage for 7 days at 23° C. and 50% r.h., measured according to ISO 4587.

One-component adhesives or sealants suitable for the adhesive system of the invention comprise, in particular, moisture-curing, isocyanate group-terminated polymers or moisture-curing, silane group-terminated polymers. Such adhesives or sealants crosslink under the influence of water, particularly of atmospheric moisture. Examples of such one-component, moisture-curing polyurethane adhesives are those from the Sikaflex and SikaTack® product line, as are available commercially from Sika Schweiz AG; for the rapid curing required in accordance with the invention, it may additionally be necessary to use an accelerator, more particularly a water-containing accelerator, also called booster. Suitable water-containing accelerator pastes of this kind are available for example under the name Sika® Booster Paste (Sika Schweiz AG).

The abovementioned isocyanate-terminated polymers are prepared from polyols, more particularly polyoxyalkylene polyols, and polyisocyanates, more particularly diisocyanates. Preference here is given to aromatic diisocyanates such as methylenediphenyl diisocyanates (MDI) or toluene 2,4-diisocyanate (TDI).

Suitability as two-component adhesives or sealants is possessed, for example, by two-component polyurethane adhesives or polyurethane sealants whose first component comprises an amine- or a polyol and whose second component comprises an NCO-containing polymer or a polyisocyanate. Examples of two-component, room temperature-curing polyurethane adhesives of this kind are those from the SikaForce® product line, as are available commercially from Sika Schweiz AG.

Additionally suitable are adhesives based on epoxy resins, acrylate adhesives, adhesives based on polysulfides, and other chemical adhesives and sealants, known to the person skilled in the art, which cure rapidly, i.e., within an hour after application at 23° C. and 50% r.h. have a tensile shear strength of at least 3 MPa, measured according to ISO 4587, and/or within an hour after application at 23° C. and 50% r.h. have at least 50%, preferably at least 60%, of the tensile shear strength attainable after curing and storage for 7 days at 23° C. and 50% r.h., measured according to ISO 4587.

It has emerged that in the adhesive system of the invention, especially when using moisture-curing polyurethane adhesives or polyurethane sealants, a significant improvement can be achieved in the adhesion, particularly to glass and glass-ceramics, and particularly after application under cold conditions (for example, −10° C.), using the adhesion promoter composition described. To the person skilled in the art it is of course clear that at lower temperatures, the development of adhesion and the curing of an adhesive or adhesive system are normally slower than at higher temperatures. Since, however, the adhesive system of the invention develops adhesion extremely rapidly under standard conditions (23° C. and 50% r.h.), the rate at low temperatures is still always acceptable.

The liquid-container for the abovementioned adhesion promoter system is preferably a metal container, more preferably a metal can. With particular preference the metal can is provided internally with protective varnishing, preferably based on epoxy-phenol varnish. In the case of metal cans without protective varnishing, it has emerged that on prolonged storage of the adhesion promoter composition at elevated temperatures, there may be damage to the inner wall of the metal can, particularly in the region of the weld seams. Such damage can be minimized by means of protective varnishing.

Suitable metals for the liquid-container are tinplate (i.e., steel whose surface has been coated with tin) or aluminum, it being possible for the aluminum likewise to have been coated or anodized.

For the manually operable delivery device, it is preferred if it is realized in the form of a top-actuated valve, and with particular preference a male top-actuated valve. In the course of the investigations conducted, it has emerged that with valves which are not implemented in the form of top-actuated valves, the problem emerges that following the first application, the activator remains partly within the ascending tube, and crystallizes there or in the valve. In the case of prolonged use of the adhesion promoter system, this leads to clogging of the delivery device, something which can be prevented by using a top-actuated valve.

The top-actuated valve is preferably a male top-actuated valve. For this type of valve it is preferred if it has one or more holes in the housing in the region of the spring, since a construction of this kind facilitates the return flow of the liquid via the ascending tube into the liquid-container when the can, after application, is brought back into an upright position. It is preferred, furthermore, if the delivery device has an ascending tube whose length is at most half of the height of the liquid-container, preferably at most one third of the height of the liquid-container, and more preferably at most one quarter of the height of the liquid-container.

For the outlet of the manually operable delivery device, it is preferred if said outlet has a diameter in the range from 0.5 to 2 mm, and preferably of about 1 mm. At a diameter of about 1 mm, the formation of spray mists of the adhesion promoter composition can be very largely suppressed, thereby facilitating accurately targeted application of the adhesion promoter composition to a desired application area.

For the liquid-container with a manually operable delivery device it is useful, moreover, if it is an airtight system. This prevents the activator within the liquid-container coming prematurely into contact with atmospheric moisture and hence being broken down.

In relation to the manually operable delivery device, particular suitability has been found for, in particular, one-part delivery devices having a disk for overhead use, and a jet application. Suitable delivery devices are sold by Lindal Dispenser GmbH, for example.

Particularly suitable valves usefully have a valve disk, an outer seal and an inner seal, a stem (valve stem), a spring, a housing, and an ascending tube. In relation to the inner seal in particular it has emerged that numerous materials break down or swell significantly on contact with the adhesion promoter compositions, meaning that such materials are unsuitable as sealing materials for the stated adhesion promoter compositions. Excessive swelling or break-down of the sealing material leads to failure of the seal after just a short time in use. For the purposes of the present invention, therefore, it is preferable if the manually operable delivery device has a seal, preferably an inner seal, which is based on styrene-butadiene rubber or on a vinylidene (di)fluoride-based rubber. Examples of suitable sealing materials are the products sold under the trade name Buna or Viton.

In contrast, chloroprene has proved to be a material particularly unsuitable for the sealing material, since this material is broken down by the adhesion promoter composition contained, after just a short storage time at room temperature. It is preferred, accordingly, if the manually operable delivery device does not have a seal which is based on chloroprene rubber materials.

For the abovementioned adhesive system wherein the adhesion promoter composition is present in a liquid-container with manually operable delivery device, the statements above relating to preferred embodiments of the constituents of the adhesion promoter composition, the adhesive, and the liquid-container with manually operable delivery device are applicable accordingly.

In one preferred embodiment, this adhesive system constitutes a kit, where the adhesion promoter composition is packaged in an airtight liquid-container which can be discharged in particular by means of superatmospheric pressure, having a manually operable delivery device, more particularly a spray can, and the adhesive is packaged as a two-component system or as a one-component system, preferably with accelerator.

The accelerator, also called booster, is preferably a water-containing composition. A kit of the kind described above, which may be offered commercially in a form packaged together, affords the advantage, for example, that the adhesion promoter composition and the adhesive can be harmonized perfectly with one another, and the application is facilitated. This is so in relation not only to the individual properties but also in relation to the quantities for use.

Application of the adhesive system of the invention takes place preferably in a plurality of steps, which are described below.

First of all, the adhesion promoter composition of the adhesive system of the invention is applied to a preferably cleaned and degreased substrate S1.

In all application instances, the adhesion promoter composition is preferably applied first to an absorbent material, such as a sponge or a cloth, made of cellulose fabric, for example, and applied with the aid thereof to the substrate S1 in a single wiping movement. This type of application is called the "wipe-on" method. This type of application may also be carried out when using an airtight container, as for example a spray can, as described later on below. The adhesion promoter composition of the adhesive system of the invention affords the advantage that there is no need for a subsequent, further wiping-off of any excess adhesion promoter composition present ("wipe-on/off" method), as is customary with many commercially available adhesion promoter compositions. The wipe-on method permits a more rapid adhesive bonding operation, since a wipe-off step may be omitted.

The adhesion promoter composition is applied in particular from an airtight container by means of superatmospheric pressure, preferably a spray can, so that the highly reactive and air-sensitive adhesion promoter composition is not exposed prematurely to the atmospheric moisture and its quality affected. In this case the contents of the airtight container are applied preferably by spraying to a pad or a cloth, such as a paper cloth or a cotton pad, for example, and then applied directly to the substrate in a single wiping movement.

Alternatively, the adhesion promoter composition of the adhesive system of the invention can also be kept in a disposable container, which is opened shortly before or during application, but is not intended for repeated use, for example, even in a glass ampoule or a plastics container, the latter preferably with an absorbent material such as a sponge attached to it. In the case of a disposable solution of this kind, it is sensible to adapt the fill quantity to a single use. Disposable containers of this kind, especially those in the form of pens with absorbent material attached to them, are described in WO 2013/041573 A1 or in WO 2013/030270 A1, for example.

If using an airtight container from which the adhesion promoter composition is applied by means of superatmospheric pressure, such as a spray can, for example, the superatmospheric pressure may be generated by means of a propellant gas, or else the superatmospheric pressure may be generated by a reduction in volume of the container, by means of a piston, for example. Examples of suitable propellant gases are air, carbon dioxide, nitrogen, and also hydrocarbons which can be liquefied under low pressure, preferably below 10 bar, such as, for example, mixtures of propane, butane, and other short-chain hydrocarbons, occasionally also referred to in general usage as LPG (Liquefied Petroleum Gas) and well known to the person skilled in the art, or other largely inert gases.

In all cases it should be ensured that the exit nozzle of the airtight container is preferably such that it discharges a thin jet of liquid rather than a mist, since in that way application can be more effectively locally controlled, sufficient adhesion promoter is applied for adequate impregnation of the pad and/or wetting of the substrate, and, moreover, the formation of a possibly health-injurious aerosol is lessened or avoided entirely.

After a short waiting time following application of the adhesion promoter composition, known as the flash-off time, typically less than 10 min, preferably 3-5 min, the adhesive of the adhesive system of the invention can be applied to the bonding area pretreated with the adhesion promoter composition. During the flash-off time, the nonalcoholic solvent L undergoes substantial volatilization, as for example at least by 50% of the amount applied to the substrate, within 10 min, and the reactive constituents of the adhesion promoter composition begin to react with the substrate S1 and/or with the atmospheric moisture.

The adhesion promoter composition of the adhesive system of the invention is therefore suitable for use as an adhesion primer for a substrate S1, the substrate S1 being, more particularly, glass or glass-ceramic.

Described below in detail are preferred modes of use of the adhesive system of the invention.

In a preferred method of adhesive bonding or sealing of two substrates S1 and S2, it comprises the following steps:
a) applying an adhesion promoter composition as described above to a first substrate S1, by wiping a carrier material impregnated with the adhesion promoter composition over the substrate S1 once;
b) applying an adhesive or sealant to the flashed-off adhesion promoter composition applied according to step a);
c) contacting the adhesive or sealant with a second substrate S2.

The method described under a) of the overwiping once corresponds to the wipe-on method described earlier on above, which requires no further wipe-off. In step a), the adhesion promoter composition is applied preferably from an airtight container, more particularly a spray can, by means of superatmospheric pressure, or from a disposable container, to an absorbent carrier material, and then applied by the wipe-on method. Of course, the adhesion promoter composition and/or adhesive may also be applied to both substrates before the two adhesive compositions are brought into contact, although this is not preferred. The second substrate S2 as well consists of the same material as or different material from the substrate S1.

Step c) is typically followed by a step of curing the adhesive or sealant. The person skilled in the art understands that crosslinking reactions, and hence the curing itself, may begin as early as during application, depending on the system used and the reactivity of the adhesive. The main part of the crosslinking and hence, in the narrower sense of the term, the curing, however, take place after application; indeed, otherwise, problems also arise with the development of adhesion to the substrate surface.

In particular, at least one of the substrates, S1 or S2, is glass or glass-ceramic. More particularly, one substrate is glass or glass-ceramic and the other substrate is a paint, a painted metal, painted metal alloy, a metal, such as a flange which has been sanded back, for example, or a bead of adhesive which has been cut back. Preferably, therefore, the substrate S1, or S2, is glass or glass-ceramic and the substrate S2, or S1, is a metal, paint, or a painted metal or painted metal alloy.

These bonding and sealing methods find application more particularly in the production and reconditioning or repair of articles, especially means of transport. Such articles constitute, in particular, automobiles, buses, trucks, rail vehicles, boats or aircraft. They may, however, also be employed in other preferred forms of application in the construction sector, such as for window glazing, for example.

The most preferred application is the glazing of means of transport, particularly of road vehicles and rail vehicles.

EXAMPLES

All percentages, unless indicated otherwise, refer to weight percent (wt %) based on the weight of the overall composition. The designation "% r.h." stands for % relative humidity, "Standard conditions" in this document denotes a temperature of 23° C. and a relative humidity of 50% r.h, in the ambient air.

The tensile shear strength was determined in accordance with ISO 4587/DIN EN 1465 on a Zwick/Roell 2005 tensile machine, with two substrates of the same material being bonded to one another in each case (bond area: 12×25 mm; layer thickness: 4.0 mm; crosshead speed: 200 mm/min; substrates: see below; conditions: 23° C., 50% r.h. (unless otherwise indicated).

Raw Materials Used:
"A-189" 3-Mercaptopropyltri ethoxysilane
  Silquest® A-189, Momentive Performance Materials, USA
"A-1170" Bis(trimethoxysilylpropyl)amine
  Silquestk A-1170, Momentive Performance Materials, USA
"Y-9669" N-Phenyl-3-aminopropyltrimethoxysilane
  Silquest® Y-9669, Momentive Performance Materials, USA
"OGT" Octylene glycol titanate
  Tyzor® OGT, DuPont, USA
"TBT" Tetra(n-butyl) titanate
  Tyzor® TBT, DuPont, USA Production of the Adhesion Promoter Compositions In accordance with the amounts in table 1, for the compositions, the solvents were mixed together with the further ingredients, where present, at 23° C. in the absence of atmospheric moisture.

TABLE 1

Composition (in wt %) of inventive adhesion promoter compositions Z-1 to Z-3 and of noninventive reference compositions R-4 to R-8.

| Ingredient | Z-1 | Z-2 | Z-3 | R-4 | R-5 | R-6 | R-7 | R-8 |
| --- | --- | --- | --- | --- | --- | --- | --- | --- |
| Heptane | 93 | 88 | 92 | 92.5 | 91 | 93 | — | 90 |
| A-1170 | 1.5 | 1.5 | 1.5 | 1.5 | 1.5 | 1.5 | 1.5 | 1.5 |
| A-189 | 2 | 2 | 2 | 2 | 2 | 2 | 2 | — |
| Y-9669 | 1.5 | 1.5 | 1.5 | 1.5 | 1.5 | 1.5 | 1.5 | 1.5 |
| OGT | — | — | — | — | — | 2 | — | — |
| TBT | 2 | 2 | 2 | 2 | 2 | — | 2 | 2 |
| Ethanol | — | — | 1 | — | — | — | 93 | — |
| 2-Propanol | — | — | — | 0.5 | 2 | — | — | — |
| tert-Butanol | — | 5 | — | — | — | — | — | 5 |
| TOTAL | 100 | 100 | 100 | 100 | 100 | 100 | 100 | 100 |

Test Methods
Application and Curing

The adhesion promoter compositions produced according to table 1 and a commercially available adhesion promoter (Sika® Aktivator PRO, Sika Schweiz) were tested together with a suitable adhesive as an adhesive system. For this purpose, 3 substrates (substrate 1, substrate 2, and substrate 3; see below) and the adhesion promoter compositions were subjected to cold storage at −10° C. for 24 h. The adhesion promoter compositions were applied likewise at −10° C. to the respective substrate in the method known as "wipe on" method by means of a wipe (Tela®, Tela-Kimberly Switzerland GmbH) and flashed off for 10 minutes before the adhesive was applied. The substrates used are listed below:
  substrate 1: Float glass (flat glass produced by the float-glass process) Sn-side, Rocholl GmbH, Germany
  substrate 2: Ferro frit 14279 for laminated safety glass on float glass, Rocholl GmbH, Germany
  substrate 3: Ferro frit 3402 for temperature-treated safety glass on float glass, Rocholl GmbH, Germany Thereafter the adhesive was applied in the form of a triangular bead (8 mm wide, 10 mm high) with a cartridge press and a triangular nozzle to the adhesion promoter-treated side of the respective substrate surface. The adhesive thereafter was pressed to a thickness of 5 mm using a polyethylene film (PE film), thereby widening the bond area to around 10 to 15 mm. After the adhesive had cured, the PE film was carefully removed. The adhesive employed in all cases was a one-component polyurethane adhesive SikaTack® MOVE$^{IT}$ (Sika Schweiz), although for the inventive adhesive systems, additionally, a water-containing booster was admixed dynamically in a ratio of 50:1 (volume of adhesive to volume of booster) in order to allow the inventive requirements of the rapid development of tensile shear strength. The adhesive with booster develops strength exceptionally rapidly and hence after no more than an hour after application, at 23° C. and 50% r.h., has a tensile shear strength of >3 MPa, measured according to ISO 4587. Without booster, this takes about 24 h. The maximum tensile shear strength of the adhesive 7 d after application and storage under standard conditions, with and without booster, is around 5 MPa. The adhesive had been stored at 23° C., 50% r.h., directly prior to application.

Following the application of the adhesive, the substrates were stored for a further 24 h at −10° C. and then transferred to the standard-conditions area, where they were stored further for 3 days more at 23° C. and 50% r.h. before the adhesion tests were conducted.

Adhesion Tests (Bead Method)

The adhesion of the adhesive systems to the 3 substrates was tested by means of a peel test. For this purpose, the adhesive specimens, produced as described earlier on above, were each incised at one end just above the bond area. The incised end was then held with round-end pliers and carefully pulled away perpendicularly to the substrate. The pulling speed was selected such that a new incision had to be made approximately every 3 seconds. For each adhesive specimen, the fraction of cohesive failure was assessed. This corresponds to the area fraction (in %) of the adhesive remaining on the bond area after the adhesive sample has been pulled away. 100% cohesive failure means that the adhesive is completely torn without detaching from the substrate. If the adhesive detaches in some places from the substrate before it tears, the fraction of cohesive failure drops (and the fraction of adhesive failure increases equally), this being a sign of a poorer adhesive system.

The results of the adhesion tests are set out in table 2.

Air Stability Tests

The adhesion promoter compositions used were subjected to a simple stability test. For this purpose, the compositions were left standing, open, under standard conditions (23° C. and 50% r.h.), with continual examination as to the point in time at which visible changes occurred under air exposure. Specifically, the specimens were examined visually for hazing and precipitation, this being a clear indication of incipient detrimental effects due to atmospheric moisture. The more reactive the adhesion promoter composition in question, the more rapidly such hazing and precipitation is observed. The results of this investigation (time in minutes until first detrimental effects are visible) are listed in table 2.

TABLE 2

Adhesion aspects (% cohesive failure) of inventive adhesion promoter compositions Z-1 to Z-3 and of noninventive reference compositions R-4 to R-7, and air stability (in minutes) of the individual compositions. The air stability denotes the time until the compositions become hazy and form significant precipitation when the vessel is left standing open at 23° C. and 50% r.h.

| Adhesion promoter composition | Adhesion aspects (% cohesive failure) | | | Air stability (min) |
| --- | --- | --- | --- | --- |
| | Substrate 1 | Substrate 2 | Substrate 3 | |
| Z-1 | 98 | 100 | 95 | 3-10 |
| Z-2 | 95 | 100 | 95 | 3-10 |
| Z-3 | 90 | 40 | 30 | 10-20 |
| R-4 | 20 | 20 | 5 | 20-30 |
| R-5 | 0 | 0 | 0 | 40-50 |
| R-6 | 10 | 10 | 20 | 80-100 |
| R-7 | 0 | 0 | 0 | >360 |
| Sika Aktivator PRO | 10 | 10 | 30 | 120-140 |

The results of the adhesion test in table 2 show clearly that of the adhesion promoter compositions tested, only the highly reactive compositions Z-1 to Z-3 are capable of reacting sufficiently rapidly with an extremely rapid adhesive in an adhesive system of the invention and developing effective adhesion to the substrates. Stabilizers such as ethanol (in Z-3), although leading to an increase in the air stability, are nevertheless adverse for the adhesion. The stabilizing effect comes from transesterification reactions with alkoxysilanes. Particularly unfavorable with regard to reactivity are stabilizers such as 2-propanol (R-4 and R-5). Conversely, larger alcohols such as tert-butanol (Z-2) have virtually no further influence on adhesion and stability.

As is also apparent from table 2, adhesion promoter compositions Z-1 to Z-3, which are suitable for inventive adhesive systems, are very reactive and last only for a few minutes of open time in the air before they begin to show detrimental effects in the form of precipitation and hazing. Depending on form of application and field of application, therefore, it is extremely advantageous for these adhesive-agent compositions to be packaged in suitable airtight application containers, such as spray cans, for instance.

Comparison of Different Adhesive Systems

To demonstrate the effect of an inventive adhesive system in comparison to conventional, noninventive adhesive systems, further adhesion experiments were conducted. Application of adhesion promoter and adhesive, and evaluation of the adhesion experiments, took place in accordance with the steps described above (application and curing, adhesion tests). The only difference was a longer cure time of 7 d instead of 3 d at 23° C. and 50% r.h. after application, in order to give the slower, noninventive adhesive systems sufficient time to cure completely. In this series of tests, all (including the inventive) adhesive systems were stored for 7 d for curing before the adhesions were tested. In this series, in addition to the three adhesion substrates used above, two further adhesion substrates were tested:

substrate 1: Float glass (flat glass produced by the float-glass process) Sn-side, Rocholl GmbH, Germany
substrate 2: Ferro frit 14279 for laminated safety glass on float glass, Rocholl GmbH, Germany
substrate 3: Ferro frit 3402 for temperature-treated safety glass on float glass, Rocholl GmbH, Germany
substrate 4: Float glass (flat glass produced by the float glass process) air-side, Rocholl GmbH, Germany
substrate 5: Ferro frit 14251 for laminated safety glass on float glass, Rocholl GmbH, Germany Z-2 (see table 1) was used as inventive adhesion promoter composition, the noninventive adhesion promoter composition R-8 (see table 1) and also the commercially available product Sika® Aktivator PRO (Sika Schweiz) as reference.

The adhesive employed in all cases, again, was the one-component polyurethane adhesive SikaTack® MOVE$^{IT}$ (Sika Schweiz), although for the inventive adhesive system, additionally, a water-containing accelerator paste (Sika® Booster Paste, Sika Schweiz AG) was admixed dynamically in a ratio of 50:1 (volume of adhesive to volume of booster) in order to allow the inventive requirements of the rapid development of tensile shear strength.

The results of the adhesion tests are set out in table 3.

TABLE 3

Adhesive aspects (% cohesive failure) of the inventive adhesive system consisting of the inventive adhesive (SikaTack ® MOVE$^{IT}$ + Booster) and the inventive adhesion promoter composition Z-2, and also of various noninventive reference adhesive systems.

| | Adhesive | | | | | |
|---|---|---|---|---|---|---|
| | SikaTack ® MOVE$^{IT}$ (Ref.) | | | SikaTack ® MOVE$^{IT}$ + Booster | | |
| | Adhesion promoter | | | | | |
| | Z-2 | R-8 | PRO[1] | Z-2 | R-8 | PRO[1] |
| | Adhesion aspects (% cohesive failure) | | | Adhesion aspects (% cohesive failure) | | |
| Substrate 1 | 100 | 100 | 97 | 100 | 5 | 20 |
| Substrate 2 | 95 | 95 | 100 | 100 | 0 | 98 |
| Substrate 3 | 100 | 90 | 100 | 100 | 0 | 40 |
| Substrate 4 | 100 | 95 | 95 | 100 | 5 | 85 |
| Substrate 5 | 100 | 90 | 100 | 100 | 0 | 60 |

[1]"PRO" denotes the commercially available Sika ® Aktivator PRO (Sika Schweiz).

The results in table 3 show that for the accelerated adhesive of the adhesive system of the invention, only the inventive adhesion promoter composition (in this case Z-2) permits flawless adhesion, and does so on all adhesion substrates tested.

Investigation of Different Sealing Materials

Different sealing materials were stored in an activator solution according to the composition Z1 specified above, for three weeks. After this time, the fraction of swelling of the materials was ascertained. The results achieved here were as follows:

TABLE 4

Swelling behavior of various sealing materials in adhesion promoter

| Inner sealing material | Swelling in % |
|---|---|
| Buna 70P4 | +0.9 |
| Neoprene NA7202 | +16 |
| Neoprene N206 | +18 |
| Butyl U-133 | +59.7 |
| Chlorobutyl CA6600 | +44.4 |
| Viton V500 | +3.5 |

From the investigations above it is apparent that, in particular, materials based on styrene-butadiene rubbers and also vinylidene (di)fluoride are suitable sealing materials for the adhesion promoter systems described.

In a further test, an activator composition according to the composition Z1 described was stored at room temperature in a spray can fitted with a neoprene seal. It was found that the seal was no longer tight after just one application after storage at room temperature for 2 months.

Investigation of the Long-Term Serviceability of the Inventive Adhesion Promoter Systems A tinplate can provided with protective varnishing and having a top-actuated valve based on polyamide/POM, comprising a one-part actuator with a valve for overhead application and a jet application nozzle with an opening diameter of 1 mm, was filled with the above-described adhesion promoter composition Z1 and equipped with a propellant. In the course of a three-month test at room temperature (25° C.), the activator was delivered via the outlet device for 10 seconds once a week. It was found that the adhesion promoter system can be used without problems even after three months of storage and the application tests.

The exemplary embodiments described above serve merely to demonstrate the effect, and do not confine the invention to the applications shown.

The invention claimed is:

1. An adhesive system comprising:
    a) an adhesion promoter composition comprising:
        i) at least one mercaptosilane MS, and
        ii) at least one polysilane PS, and
        iii) at least one transition metal complex K having substantially only unidentate ligands, and
        iv) at least one nonalcoholic solvent L, and
    b) an adhesive, wherein the adhesive is a one-component, moisture curing polyurethane adhesive containing a water-containing booster, and
        the adhesive within an hour after application and storage at 23° C. and 50% relative humidity has a tensile shear strength of at least 3 MPa, measured according to ISO 4587, and/or within an hour after application and storage at 23° C. and 50% relative humidity has at least 50%, of the tensile shear strength attainable after application and storage for 7 days at 23° C. and 50% relative humidity, measured according to ISO 4587, and wherein
        the composition contains an amount greater than 0% and at most 5 wt % of tertiary butyl alcohol.

2. The adhesive system as claimed in claim 1, wherein the weight fraction of mercaptosilane MS is 0.5 wt %-10 wt %, based on the weight of the adhesion promoter composition.

3. The adhesive system as claimed in claim 1 wherein the polysilane PS has at least one secondary or tertiary amino group and either:
    comprises at least one polysilane of the formula (IV),

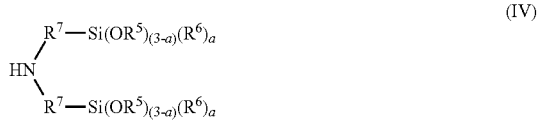

(IV)

where $R^5$ independently at each occurrence is an alkyl group having 1 to 4 C atoms or an acyl group having 1 to 4 C atoms, the index a has a value of 0, 1 or 2, $R^6$ independently at each occurrence is H or is an alkyl group having 1 to 10 C atoms, and $R^7$ is a linear or branched alkylene group having 1 to 6 C atoms or
has at least one structural element of the formula (V) or (VI)

(V)

-continued

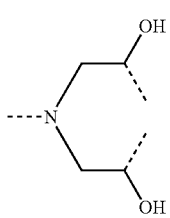
(VI)

where the weight fraction of polysilane PS is 0.1 wt % 10 wt %, based on the weight of the adhesion promoter composition.

4. The adhesive system as claimed in claim 1, wherein the transition metal complex K is a titanium complex having unidentate ligands.

5. The adhesive system as claimed in claim 1, wherein the weight fraction of transition metal complex K is 0.5 wt % 15 wt %, based on the weight of the adhesion promoter composition.

6. The adhesive system as claimed in claim 1, wherein the weight fraction of nonalcoholic solvent L is 40 wt % 99 wt %, based on the weight of the adhesion promoter composition.

7. The adhesive system as claimed in claim 1, wherein the adhesion promoter composition comprises an aminosilane AS which has the formula (I), or the formula (I') or the formula (XII),

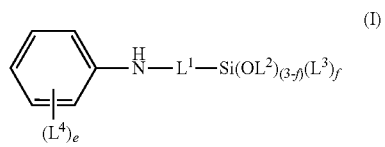
(I)

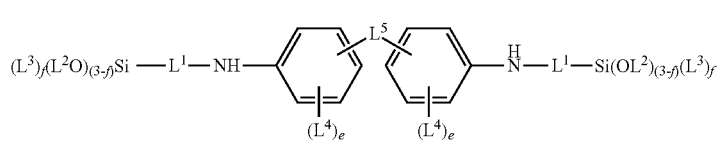
(I')

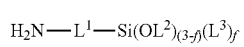
(XII)

where $L^1$ is a linear or branched alkylene group, C atoms or is a 3-azahexylene radical, $L^2$ independently at each occurrence is an alkyl group having 1 to 4 C atoms or an acyl group having 1 to 4 C atoms, $L^3$ independently at each occurrence is H or is an alkyl group having 1 to 10 C atoms, $L^4$ independently at each occurrence is an optionally branched alkyl radical having 1 to 5 C atoms, an optionally branched alkoxy radical having 1 to 5 C atoms, an optionally branched ester radical having 1 to 5 C atoms, $NO_2$ or halogen atoms, $L^5$ is an optionally branched alkylene radical having 1 to 5 C atoms, and f has a value of 0, 1 or 2, and e is an integer from 0 to 3.

8. The adhesive system as claimed in claim 7, wherein the weight fraction of aminosilane AS is 0.1 wt %-10 wt %, based on the weight of the adhesion promoter composition.

9. The adhesive system as claimed in claim 7, wherein the molar ratio of all mercaptosilanes MS used in the adhesion promoter composition to all polysilanes PS used in the adhesion promoter composition to all aminosilanes AS used in the adhesion promoter composition to all transition metal complexes K used in the adhesion promoter composition is 1 to 0.05-1.5, 1 to 0.05 to 1.5, and 1 to 0.1-3 respectively.

10. The adhesive system as claimed in claim 1, wherein the adhesive is moisture-curing, being a polyurethane adhesive and/or an adhesive based on silane-terminated polymers.

11. The adhesive system as claimed in claim 1, wherein the adhesive system constitutes a kit, where
the adhesion promoter composition is packaged in an airtight container which can be discharged and
the adhesive is packaged as a two-component system or as a one-component system.

12. A method comprising bonding and/or sealing at least two substrates S1 and S2, wherein one of these substrates is a means of transport, and another of these substrates is a sheet with an adhesive system as claimed in claim 1.

13. A method for adhesively bonding two substrates S1 and S2, utilizing an adhesive system as claimed in claim 1, wherein the method has at least the following steps:
a) applying the adhesion promoter composition to a first substrate S1 by wiping a carrier material impregnated with the adhesion promoter composition over the substrate Si once;
b) applying the adhesive to the flashed-off adhesion promoter composition applied according to step a);
c) contacting the adhesive with a second substrate S2;
wherein the second substrate S2 consists of the same material as or different material from the substrate S1.

14. An article, a means of transport, for whose production or reconditioning a method as claimed in claim 13 is carried out.

15. An adhesion promoter system, comprising a liquid-container having a manually operable delivery device, wherein said liquid-container contains an adhesion promoter composition comprising
v) at least one mercaptosilane MS, and
vi) at least one polysilane PS, and
vii) at least one transition metal complex K having substantially only unidentate ligands, and
viii) at least one nonalcoholic solvent L.

* * * * *